May 29, 1962 L. G. LEWIS ET AL 3,037,123

ELECTRONIC ARBITRARY FUNCTION GENERATOR

Filed May 2, 1958 3 Sheets-Sheet 1

INVENTORS:
Lloyd G. Lewis
L. Glenn Whitesell
Irwin Ginsburgh

BY Gerald Rose
ATTORNEY

INVENTORS:
Lloyd G. Lewis
L. Glenn Whitesell
Irwin Ginsburgh
BY Gerald Rose
ATTORNEY

ELECTRONIC ARBITRARY FUNCTION GENERATOR

Filed May 2, 1958 3 Sheets-Sheet 3

INVENTORS:
Lloyd G. Lewis
L. Glenn Whitesell
Irwin Ginsburgh

BY Gerald Rose
ATTORNEY

United States Patent Office 3,037,123

Patented May 29, 1962

3,037,123

ELECTRONIC ARBITRARY FUNCTION GENERATOR

Lloyd G. Lewis, La Grange, Ill., Lowell Glenn Whitesell, Hammond, Ind., and Irwin Ginsburgh, Chicago, Ill., assignors to Standard Oil Company, Chicago, Ill., a corporation of Indiana Filed May 2, 1958, Ser. No. 732,709

18 Claims. (Cl. 250—217)

This invention relates to apparatus for producing an electrical output voltage having a magnitude which is a pre-selected arbitrary function of an input voltage. More particularly, this invention is concerned with improvements leading to superior performance and increased accuracy of arbitrary function generators of the photoformer type.

In the study of dynamic systems by electrical analog computers it is frequently necessary to provide an output voltage which is a preselected mathematically-indefinable or "arbitrary" function of a given input voltage. Where the output voltage must be generated rapidly, electromechanical function generators are unsuitable and instead electronic arbitrary function generators of the photoformer type are commonly employed. Photoformers are electronic systems in which the electron beam of a cathode ray oscilloscope tube generates a visible spot which is caused to trace the contour of function-defining mask covering a portion of the tube face, and in so doing generates an output voltage which varies according to the contour of the mask. In the operation of photoformers, an input voltage which is proportional to the abscissa of the function to be generated is applied to the horizontal deflection plates of the oscilloscope tube in order to traverse the spot horizontally across the tube. Meanwhile, a photoelectric detector positioned in front of the tube face observes the fraction of the spot which is exposed above the mask edge and, through an amplifier, produces an output voltage proportional to the fraction of the spot which it observes. This output voltage is then fed back by a conventional feedback connection to the vertical deflection plates in the oscilloscope tube. If less than a pre-selected fraction, say one-half, of the spot is exposed above the mask edge at any given instant, the amount of light the detector observes is reduced, and this produces a feedback voltage which changes the voltage applied to the vertical deflection plates in a direction tending to raise the spot. Conversely, if more than half of the spot becomes exposed, the voltage applied to the vertical deflection plates is adjusted to lower the spot. By this action, while the spot is traversed horizontally across the cathode ray tube face, the photoelectric detector causes the spot to move vertically so as to trace the mask contour. Since the horizontal position of the spot is proportional to the input voltage, and the vertical position is proportional to the voltage at the vertical deflection plates, the vertical deflection plate voltage is proportional to that function of the horizontal deflection voltage which is described by the contour of the opaque mask.

While arbitrary function generators of the photoformer type have been widely used, those known to the prior art suffer several disadvantages. Poor accuracy is one of the most serious limitations, and in photoformers described in publications such as the article by Hancock in Proceedings of National Electronics Conference, 1951, vol. 7, p. 228, an inaccuracy of as much as 0.5% of the full scale voltage is obtained. Among the reasons for poor accuracy are non-uniform oscilloscope phosphor sensitivity and random fluctuations in power supply voltage, both of which cause variations in the spot intensity on the cathode ray tube. Furthermore, existing photoformers are limited in their ability to define sharply sloping or discontinuous functions when the input voltage varies rapidly. It has previously been proposed to obviate the poor accuracy due to nonuniform phosphor sensitivity by causing the spot to follow a zig-zag path along a comparatively wide transparent function-generating band on an opaque mask, and then averaging the result by filtering the generated voltage. This averaging method however is inconsistent with the obtention of any accuracy in the reproduction of a function. It has also been proposed to compensate for electron and optical aberrations in the cathode ray oscilloscope tube by employing the tube to draw the arbitrary function on a sensitized photographic plate, which would subsequently be developed and then employed to generate that same function in a reverse operation. This latter system requires that function defining masks be matched to individual cathode ray tubes, rendering the use of a mask produced on one tube impossible with another. Accordingly, it is a primary general object of the present invention to provide an arbitrary function generator of the photoformer type capable of using interchangeable masks, and which is capable of generating arbitrary functions at high speed with an accuracy of greater than 99.9%.

Briefly, the arbitrary function generator of the present invention comprises means for maintaining a constant illumination of the function-tracing spot, and provides means for compensating for imperfect orthogonality, or deviation from perpendicularity, between the vertical and the horizontal deflection plates of the cathode ray oscilloscope tube. In addition, a circuit is provided for resetting a displaced spot on the function. There is also provided an improved function-defining mask and means for exactly positioning the mask relative to the oscilloscope tube. By these improvements, a function generator is provided which is capable of generating sharply sloping—or even discontinuous—functions with an inaccuracy of less than 0.1% of full scale, and at repetition rates of as much as 1000 cycles per second or more. Details of the construction and operation of the improved arbitrary function generator of the invention will become apparent form the following description read in conjunction with the accompanying drawings in which:

OPERATION OF FUNCTION GENERATOR

Figure 1:
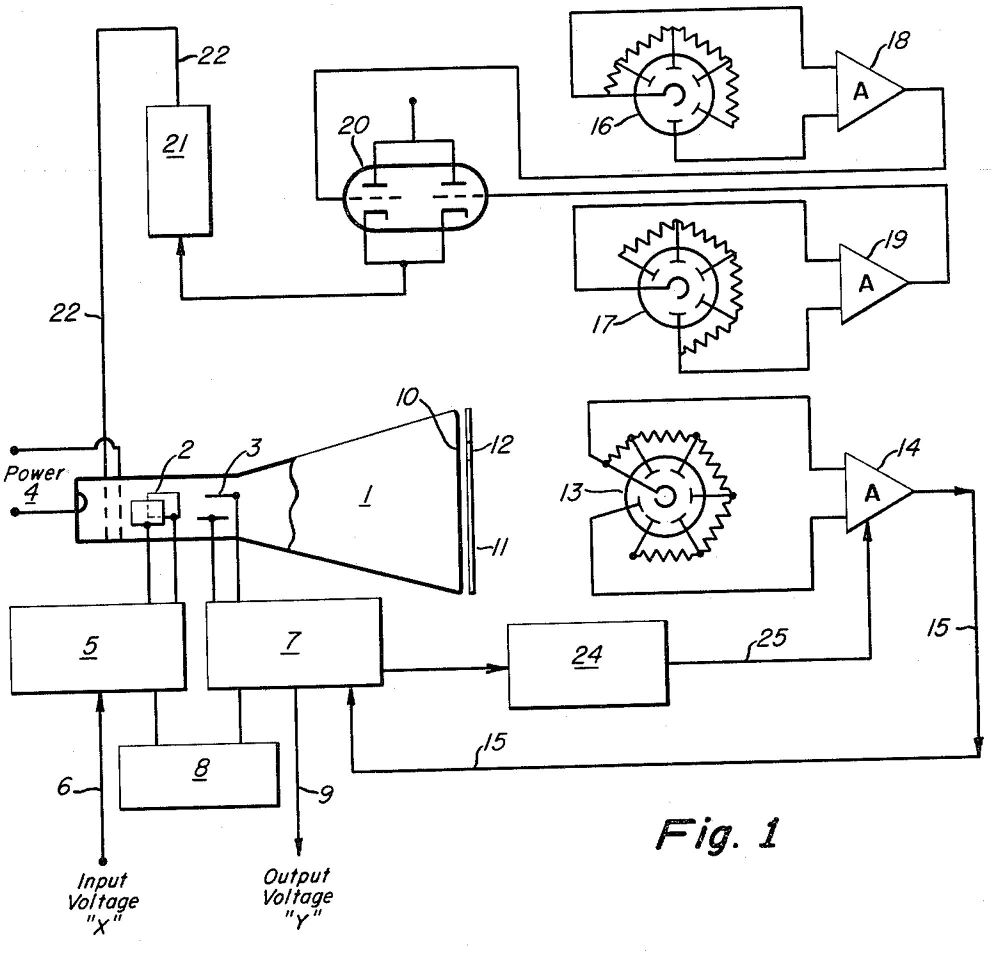
FIGURE 1 is a schematic circuit diagram of the arbitrary function generator of the present invention.

Referring to FIGURE 1, the function generator of the present invention comprises cathode ray oscilloscope tube 1; function-defining mask 11; a vertical deflection circuit comprising measure phototube 13, D.C. amplifier 14, and vertical deflection control circuit 7 leading to a pair of vertical deflection plates 3 in cathode tube 1; a spot intensity regulator circuit comprising phototubes 16 and 17, D.C. amplifiers 18 and 19, an "either-or" selector 20 which transmits the larger output from either of D.C. amplifiers 18 or 19 to intensity control circuit 21 and thence to control grid 23 in the cathode ray tube; and a spot reset circuit 24. The function generator operates by feeding an input voltage "X" from terminal 6 through horizontal deflection control circuit 5 to horizontal control plates 2 in cathode ray oscilloscope tube 1. This input voltage traverses an electron beam horizontally across face 10 of the cathode ray tube 1. Meanwhile, opaque mask 11 is positioned external to face 10 of the cathode ray tube and has a thin transparent band, the bottom edge of which defines the function to be generated.

In front of cathode ray tube 1 there is placed measure phototube 13 which can observe the spot of light on face 10 of tube 1 only if the spot is positioned along the transparent band 12 of mask 11. The bottom edge of transparent band 12 is accurately drawn to define the function to be generated; as the spot follows the function-defining edge of transparent band 12 it results in the generation of an output voltage "Y" at connection 9 which is the pre-selected arbitrary function of "X," the input voltage. This output voltage or arbitrary function is then fed to the electronic analog computer.

Measure phototube 13, its associated D.C. amplifier 14, and vertical deflection control circuit 7 are connected in a closed feedback loop such that if the proper fraction of the spot is not observed by phototube 13 there will be a change in the voltage applied to vertical deflection plates 3 to move the spot either up or down until the proper fraction of the spot appears above the mask. Initially, the output of measure phototube 13 is adjusted so that the voltage applied to vertical deflection plates 7 will maintain a desired fraction of the spot, say one-half, above the bottom edge of transparent band 12 on mask 11. Thus, as the spot is traversed horizontally across face 10 of cathode tube 1 by horizontal deflection plates 2, if the bottom edge of transparent band 12 slopes upward, the visible half of a spot traveling only horizontally will be partially obscured. This partial obscurity is observed as less than one half of the spot by phototube 13, and a voltage is produced which is transmitted to vertical deflection plates 3 so as to raise the spot to its former half-visible position with respect to transparent band 12. Conversely, if transparent band 12 drops, the horizontally-traveling spot will be more visible to measure phototube 13, and consequently measure phototube 13 will transmit a feedback voltage to vertical deflection plates 3 which will lower the spot on face 10. The voltage which operates vertical deflection control plates 3 is also proportional to the desired output voltage of the function generator which is transmitted through connection 9 to the analog computer.

SPOT INTENSITY REGULATOR CIRCUIT

If the phosphor on cathode ray tube 1 were to have a non-uniform sensitivity to the electron beam, the spot produced on face 10 would appear to have a changing intensity even though the same fraction of the spot is visible above mask 11. A similar apparent variation in spot intensity can be caused by fluctuations in the electrical power supplied to the function generator. For these reasons, a spot intensity regulator circuit is provided which operates entirely independent of the vertical deflection circuit. This intensity regulator circuit maintains a spot having a constant illumination regardless of the influence on spot intensity of non-uniform phosphors or power supply voltage fluctuations. Were there no intensity regulator circuit, should the spot intensity vary, measure phototube 13 would look upon this not as a spot intensity variation but as a variation in the spot area visible above the mask function line. Thus if the spot should be brighter at one instant, measure phototube 13 would read this as a rising spot and would actuate vertical deflection plates 3 to lower the spot. In other words, should the phosphor sensitivity be greater at one portion of face 10 of the cathode ray tube 1, the spot would dip at that point because the vertical deflection circuit would indicate that the spot were more than half exposed, and would depress the spot to hide more of the spot below the mask. There would then be a dip at that point in the functional relation input and output which would cause an inaccuracy in the generated function.

The intensity regulator circuit operates by means of intensity regulator phototubes 16 and 17, which are positioned so that one or the other of the phototubes can always observe the entire spot on the cathode ray tube 1 independent of the obstruction caused by mask 11. Phototubes 16 and 17 are positioned above and on each side, i.e. in adjacent quadrants, relative to the vertical axis of cathode ray tube 1 and measure phototube 13. By this means they are able to "see over" the function defining edge 12 of mask 11 and hence observe the entire spot unobstructed by the opaque portion of mask 11. Also, by positioning the tubes in adjacent quadrants, one or more of the phototubes can "see around" the edge of sharply rising or falling or even vertical functions, and the spot will never be hidden from both of these phototubes 16 and 17 at the same time. The respective outputs of phototubes 16 and 17 are amplified and fed to an "either-or" selector tube 20 which selects and transmits only the greater of the phototube outputs through circuit 21 to grid 23 in cathode ray tube 1. The voltage on grid 23 increases or decreases the strength of the electron beam so as to maintain a constant illumination or intensity of the visible spot on face 10 at all times, irrespective of non-uniform phosphor sensitivity or of fluctuations in power supply voltage. The intensity of the spot on face 10 is thus maintained constant by a circuit which operates entirely independent of the vertical deflection circuit actually generating the arbitrary function.

CATHODE RAY TUBE

Cathode ray tube 1 is a conventional precision oscilloscope tube having horizontal and vertical deflection plates, respectively 2 and 3, to position or deflect the electron beam so as to produce a spot having a location proportional to the voltage applied to the plates. Preferred tubes are of the well known Du Mont 5AQP type which features a monoaccelerator principle in the electron gun in order to obtain linearly proportional deflection characteristics of the electron beam. The tube also has a separately-cast flat face screen to reduce optical aberration errors. A short-persistence P–15 type phosphor is desirably employed on the tube face, as short persistence phosphors are required for high speed performance of a photoformer-type function generator. When employing P–15 phosphors in the present circuit, input voltage frequencies on the order of 1000 cycles per second are readily accommodated. The cathode ray tube 1 is contained within a mu-metal cannister for magnetic shielding, and is so mounted that it may be rotated about its own axis to alter its orientation with respect to mask 11 in order that the horizontal axis of deflection of the tube may be made to coincide precisely with the horizontal axis of function mask 11. As is usual, the terms "horizontal" and "vertical" refer to the input and output plates, respectively, and do not necessarily indicate the physical orientation of tube 1.

FUNCTION MASK

Figure 2:
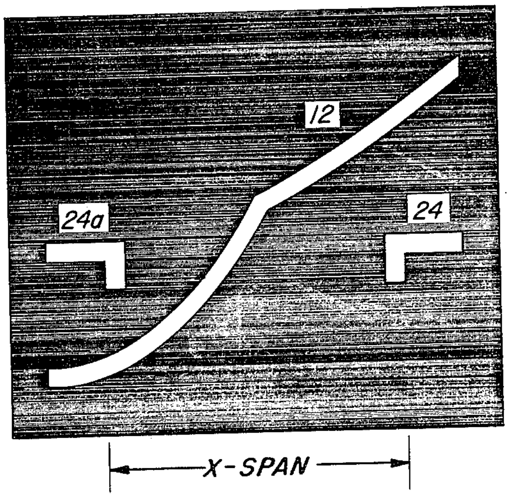
FIGURE 2 is an improved function-generating mask.

The preferred function mask is shown in FIGURE 2. Mask 11 has an opaque area with a thin transparent band 12 and one or more zero and span adjusting transparent bands 24 and 24*a*. The bottom edge of transparent band 12 defines the function to be generated. To reduce the effect of the halo which normally forms around the illuminated spot and causes an apparent rounding off of sharp function corners, the mask comprises an opaque area having a narrow transparent band 12, the lower edge of which defines the function to be generated. This band 12 is at least as wide as the spot diameter but is narrower than the halo. Band 12 therefore blanks off a large amount of the halo while still presenting a clear view of the entire spot to at least one of the intensity regulator phototubes 16 and 17.

Although mask 11 may be prepared in numerous ways, it has been found that a precision and accuracy in excess of that of the photoformer itself may be attained by $R_{34}$ is used to regulate the output of cathode follower tube $V_{12}$ so as to fire bulb $L_1$ when the pre-selected vertical height of the spot, corresponding to a certain vertical deflection plate voltage, is reached, and thereby charge condenser $C_1$. This charge on condenser $C_1$ alters the input voltage to the D.C. voltage amplifier tube $V_1$ so as to deliver an output to the vertical deflection plates which drives the spot down to the bottom of the cathode ray tube face. Once the spot is at the bottom of the tube face, the deflection plate voltage which causes neon bulb $L_1$ to fire is removed from the bulb, extinguishing the bulb and returning deflection control to phototube 13. Since phototube 13 is then unable to see the spot, it being hidden now by the lower opaque portion of the mask 11, it will again drive the spot upward until it reaches the function band 12, at which time phototube 13 adjusts the spot position relative to the line, and the spot reset cycle has been completed. By this action, the reset circuit acts to return the spot from the vertical limit back down to the function curve in the event the spot is displaced by a transient or by noise. Another result of the action of this reset circuit is to cause the spot to oscillate continuously up and down the full height of the screen in the event malfunction should occur in measure phototube 13, the cathode ray tube 1, the high voltage source, or the spot intensity control circuit 21.

The spot reset circuit 24 is connected to an over-deflection alarm circuit through twin diode tube $V_{13}$ and associated biasing network. By adjusting resistors $R_{36}$ and $R_{37}$, the voltages from cathode follower $V_{12}$ (which is required to cause the diodes in tube $V_{13}$ to conduct) can be adjusted to correspond to a spot height slightly below the height at which the spot reset action takes place. When the height limit established by resistors $R_{36}$ and $R_{37}$ is exceeded, an output from twin diode tube $V_{13}$ is transmitted to an external over-deflection alarm of conventional type which delivers a visual or audible signal. This signal occurs either when the reset action takes place or when the spot oscillates upon equipment failure.

ORTHOGONALITY CORRECTION CIRCUIT

A highly desirable feature of the present invention is the inclusion of a circuit to correct for inaccuracies in the manufacture of the cathode ray tube 1. In the event that the horizontal and the vertical deflection plates did not deflect the spot exactly at right angle axes, which would occur if the respective plates were physically not exactly perpendicular to each other, the horizontal spot position on the oscilloscope screen would be displaced somewhat, and would produce an error in the arbitrary function produced by the generator. This is referred to as the orthogonality error of the tube. Therefore, an orthogonality adjustment is provided which comprises an adjustable resistor $R_{29}$ which is alternatively connected from either one of the vertical deflection control input lines to either one of the horizontal deflection control inputs, depending on the direction of the orthogonality error in a particular cathode ray tube. Which vertical and horizontal deflection plates the voltage is taken from depends upon which direction the cathode ray tube plates vary from the required perpendicularity. This direction and adjustment are determined by trial and error with each cathode ray tube using a vertical function-defining band, and the connection is made to the proper plate either by a switch or by a permanent connection which can be changed if the cathode ray tube is replaced. This connection applies a fixed fraction of the horizontal-deflecting voltage to the vertical-deflecting plates and, in effect, electrically realigns the plate angles.

SPOT INTENSITY REGULATOR CIRCUIT (DETAILS)

Figure 3:
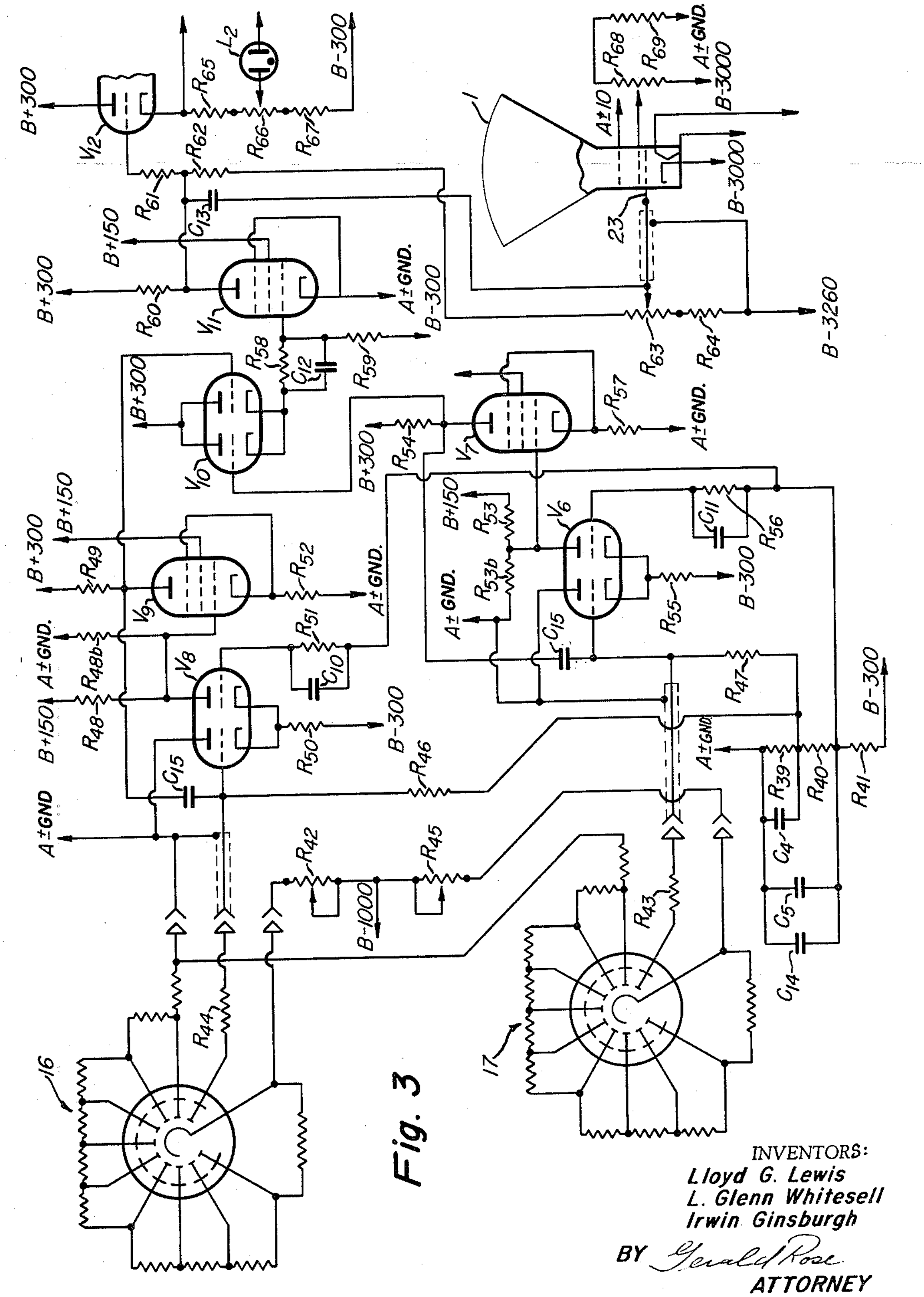
FIGURE 3 is a circuit diagram of the function generator spot intensity regulation circuit.

As previously demonstrated, any variation in spot intensity produces a small displacement of the spot and hence results in a small inaccuracy in the arbitrary function. A spot intensity regulator circuit is therefore incorporated which operates independent of other parts of the function generator to precisely regulate the intensity of the cathode ray tube spot. Referring to FIGURE 3, two 931-A photomultiplier tubes 16 and 17, either or both of which can see the whole spot at all times, feed their respective output signals to two identical two-stage D.C. amplifiers ($V_8$ and $V_9$, and $V_6$ and $V_7$) similar to the first two stages of the vertical deflection circuit amplifier ($V_1$ and $V_2$ in FIGURE 2). The outputs of the two amplifiers are fed to a common tube $V_{10}$ which acts as an "either-or" device. It accepts the larger of the two outputs, depending on whether phototube 16 or phototube 17 is observing the whole spot. In other words, it passes "either" the amplified signal from intensity regulator phototube 16 "or" the amplified signal from tube 17, which ever signal indicates the greater illumination. The signal from the other intensity regulator phototube is rejected entirely. The selected signal is then fed to amplifier tube $V_{11}$ and is used to drive one end of an adjustable voltage divider network (composed of resistors $R_{63}$ and $R_{64}$) which supplies bias to grid 23 of cathode ray tube 1. Variations in the voltage applied to control grid 23 regulate the intensity of the spot. Actual adjustment of the spot intensity at which the spot intensity regulator circuit functions is made by setting the adjustment of resistors $R_{42}$ and $R_{45}$ at a time when both phototubes can see the spot, in order to equalize the respective outputs of intensity regulator phototubes 16 and 17 and permit the same voltage from each tube to be fed to the either-or selector tube $V_{10}$. By varying this latter voltage manually by means of resistor $R_{63}$, the spot intensity is regulated so as to provide an intensity which can be accommodated conveniently by all amplifiers within the circuit.

Tube $V_{12}$ and resistance $R_{66}$ together with neon bulb $L_2$ comprise an intensity alarm control. By adjusting $R_{66}$, the fraction of the intensity regulator output voltage applied to neon lamp $L_2$ can be varied so as to cause the lamp to discharge and operate an external visible or audible alarm if the regulator circuit fails or approaches too closely to one end of its operating range.

SPECIFIC EMBODIMENT

Specific values of resistances and capacitances, etc. for the various components of the present circuit, which have been found to provide effective and stable operation of the arbitrary function generator desired herein, are set forth below.

*Resistors*

$R_1$—100K, w.w.
$R_2$—1 meg., ½ w.
$R_3$—10 meg., 2 w. precistor
$R_4$—330K, 1 w.
$R_5$—270K, 1 w.
$R_6$—10 meg., 2 w. precistor
$R_7$—47K, 2 w.
$R_8$—1.5K, 1 w.
$R_9$—1 meg., ½ w. precistor
$R_{10}$—20 meg. precistor 2 w.
$R_{11}$, $R_{12}$—Parasitic suppressors
$R_{13}$—25K, 25 w.w.w.
$R_{14}$—30K.
$R_{15}$—1 meg.
$R_{16}$—100K, prec. w.w.
$R_{17}$—200K, prec. w.w.
$R_{18}$—200K, prec. w.w.
$R_{19}$—1 meg. prec. w.w.
$R_{20}$—1 meg. prec. w.w.
$R_{35}$—330K, 1 w.
$R_{36}$—50K.
$R_{37}$—50K.
$R_{38}$—330K, 1 w.
$R_{39}$—40K.
$R_{40}$—10K.
$R_{41}$—250K.
$R_{42}$—100K, w.w.
$R_{43}$—15 meg., ½ w.
$R_{44}$—15 meg., ½ w.
$R_{45}$—100K, w.w.
$R_{46}$—10 meg. precistor 2 w.
$R_{47}$—100K, w.w.
$R_{48}$—330K, 1 w.
$R_{48b}$—150K, 1 w.
$R_{49}$—56K, 2 w.
$R_{50}$—270K, 1 w.
$R_{51}$—10 meg. prec. 2w.
$R_{52}$—1K, 1 w.
$R_{53}$—330K.
$R_{53b}$—150K, 1 w.
$R_{54}$—56K, 2 w.
$R_{55}$—270K, 1 w.

drawing the appropriate function defining band and a set of perpendicular zero and span bands 24 and 24*a* in enlarged scale in ink on a large sheet of precision graph paper and then photographing the graph on a fine-emulsion glass photographic plate. When developed, the plate is a negative of the drawn graph and is opaque except for the function-defining transparent band 12 and zero and span alignment bands 24 and 24*a*. It will be observed that bands 24 and 24*a* each have sharp corners therein at the angular intersection; these corners, which are preferably right angles but may be any angle equal to or less than 90°, are employed in the manner to be described below. These bands 24 and 24*a* are covered with opaque tape after mask 11 is aligned. Function-defining band 12 extends at least one spot width beyond the corners of bands 24 and 24*a*.

ZERO AND SPAN ALIGNMENT

The purposes of zero and span alignment bands 24 and 24*a* are to provide a reference horizontal axis for exact alignment of mask 11 with respect to the horizontal axis of cathode ray tube 1, and to provide corners which define the zero and span of band 12 so that the "Y" output will be an accurate function of the "X" input to the generator. Bands 24 and 24*a* are employed as follows (refer to FIGURE 4):

Mask 11 is positioned in front of the cathode ray oscilloscope tube 1. Initially there may be a slight angular misalignment, and this is compensated for by physically rotating tube 1 (or mask 11) about its own axis until the "Y" output with the spot placed on the lower horizontal edge of band 24*a* (FIGURE 2) is exactly equal to the "Y" output when the spot is along the lower horizontal edge of band 24. Then, in order to adjust the horizontal span of the generator, with the minimum input voltage "X" applied to terminal 6, ganged potentiometers $R_{23}$ and $R_{24}$ are set to position the spot exactly on the right angle corner of line 24*a*. The spot is then moved to the right angle corner of band 24 by applying the maximum input voltage "X" to terminal 6 and then regulating potentiometer $R_{32}$ until the spot is exactly positioned at the corner; this establishes the horizontal span adjustment. To adjust the "Y" output, the "X" input is then returned to its minimum value and the spot is lowered to a position on function-defining band 12 which is directly below the corner of band 24*a*. The vertical zero adjustment is then made by regulating ganged potentiometers $R_{21}$ and $R_{22}$ so that a voltage is produced at terminal 9 which is the desired "Y" value of the arbitrary function when "X" is at a minimum value. The input voltage is then increased until the maximum value of "X" input is attained to move the spot along the bottom edge of function-defining band 12; potentiometer $R_{14}$ is adjusted to deliver a "Y" output which corresponds to the "Y" value at the maximum value of the input voltage. The function generator is now adjusted to deliver accurately an output voltage at terminal 9 which is at all positions the desired arbitrary function of the input voltage to terminal 6. It will be noted that the arbitrary function may be generated in any one or more quadrants by employing negative instead of positive values for the maximum and/or minimum values of "X" and/or "Y."

VERTICAL AND HORIZONTAL DEFLECTION CIRCUITS

Returning to FIGURE 1, the vertical and horizontal deflection circuits 7 and 5 are interconnected by an orthogonality correcting circuit to be described presently. This connection feeds a portion of the voltage applied to the vertical deflection plates 3 into the horizontal deflection circuit 5 in order to correct for any imperfect orthogonality between the deflection produced by the vertical deflection plates 3 in the cathode ray tube, and the deflection produced by the horizontal deflection plates 2. Thus in the event that these two deflections are not physically at right angles, the angle is corrected electrically.

Figure 4:
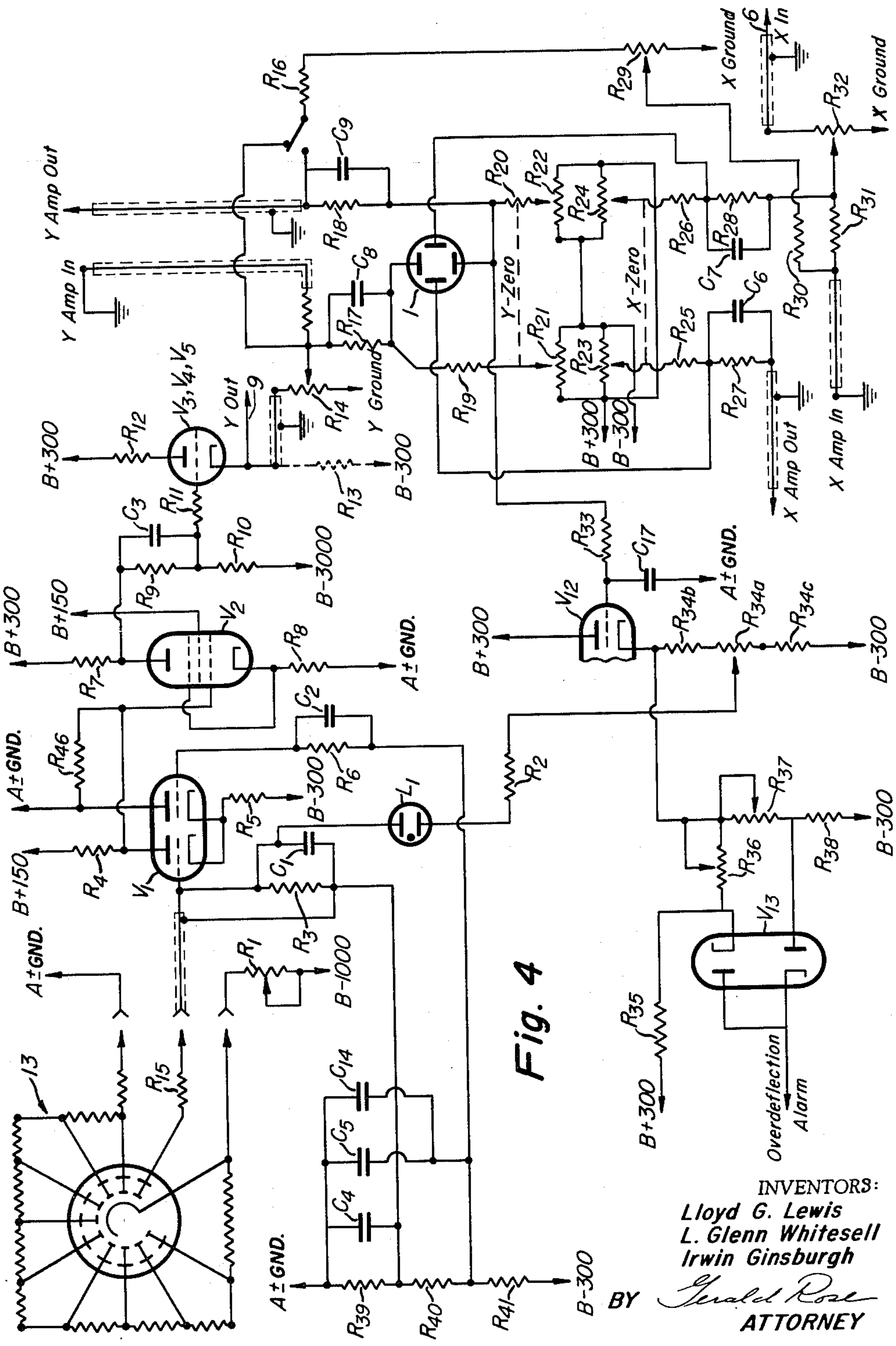
FIGURE 4 is a circuit diagram of the function generator vertical deflection circuit.

The vertical deflection circuit is shown in FIGURE 4 and is so designed that if the spot on cathode tube 1 is not observed in the proper relation to function defining band 12 on mask 11, there will be generated a vertical deflection feedback voltage which will move the spot up or down so as to reposition the spot in its correct location. The "X" input voltage is fed in at terminal 6 while the "Y" output is taken off at terminal 9. The vertical deflection circuit comprises measure photo-tube 13, an amplifier usign tubes $V_1$ and $V_2$ as voltage amplifier stages and tubes $V_3$—$V_4$—$V_5$ in parallel as a high current capacity cathode follower output stage for driving the analog computer, together with cathode ray tube vertical deflection plates 3. Not shown in FIGURE 4 but attached to the terminals marked "Y amp. in," "Y amp. out," "X amp. in," and "X amp. out" are conventional summing D.C. amplifiers of well-known type which are connected into the circuit shown so as to drive the opposite beam-deflecting plates of cathode ray tube 2 with a push-pull action. Photosensitive measure phototube 13 is preferably of the photomuliplier design, exemplified by tube type 931A. When measure phototube 13 is a photomultiplier, it serves as the first stage of a D.C. voltage amplifier. Potentiometer $R_1$ permits adjustment of the photomultiplier gain so as to regulate the desired fraction of the spot which is visible above the opaque portion of mask 11. The output from phototube 13 is amplified in voltage amplifier $V_1$ and then passes through an additional stage amplifier $V_2$, from whence it is sent to a high current capacity cathode follower output stage shown as one tube, $V_3$—$V_4$—$V_5$, which is in practice three tubes connected in parallel and provided with parasitic suppressors. The plate output of tubes $V_3$—$V_4$—$V_5$ is conducted both to the analog computer and to the vertical deflection control plates 3 in the cathode ray tube 1. That portion of the plate output sent to the computer is the arbitrary function generated by the apparatus.

SPOT RESET CIRCUIT

Since the vertical spot position is automatically controlled in the present circuit, if a transient or noise in the power supply voltage or the horizontal deflection control were to displace the spot away from the function generating line, a spot reset circuit (represented by box 24 on FIGURE 1) is provided. If a displaced spot were free to move upward out of the transparent function band 12, it would be shielded by the opaque portion of the mask above the band. Since measure phototube 13 would not then observe any light, it would signal to elevate the spot exactly as if the spot were below the function line. However, with the spot behind the opaque portion of the mask 11 and above the function band, this would cause the spot to move even further upward. Since the spot would already be off the face of the tube there would be a positive feedback into the function generator resulting in complete loss of control. Therefore, to prevent the spot from rising beyond predetermined limits above the function band, a spot reset circuit 24 is provided which acts to deflect the spot downward whenever a pre-selected vertical limit is exceeded. In effect, when the spot exceeds the vertical limit, the vertical deflection control plates are sent an artificial signal indicating too much light even though measure phototube 13 is unable to observe any spot whatsoever. The reset circuit (which is shown in detail on FIGURE 4), which transmits the signal comprises tube $V_{12}$ which is connected to one of the vertical deflection control plates 3 of cathode ray tube 1 for the purpose of delivering a cathode output through neon bulb $L_1$ to the input grid of $V_1$. This action takes place only when the vertical deflection voltage on plates 3 is of such magnitude as to deflect the spot above the preselected limiting height on cathode ray tube face 10. Potentiometer resistance

*Resistors*

| | |
|---|---|
| $R_{21}$—300K. | $R_{56}$—10 meg. precistor 2 w. |
| $R_{22}$—300K. | $R_{57}$—1K, 1 w. |
| $R_{23}$—300K. | $R_{58}$—82K, 1 w. |
| $R_{24}$—300K. | $R_{59}$—150K, 1 w. |
| $R_{25}$—1 meg. prec. w.w. | $R_{60}$—47K, 2 w. |
| $R_{26}$—1 meg. prec. w.w. | $R_{61}$—330K, ½ w. |
| $R_{27}$—200K, pres. w.w. | $R_{62}$—10 meg. precistor 8 w. |
| $R_{28}$—200K, prec. w.w. | $R_{63}$—250K. |
| $R_{29}$—5K, w.w. | $R_{64}$—500K, precistor 1 w. |
| $R_{30}$—1 meg. prec. w.w. | $R_{65}$—100K, 1 w. |
| $R_{31}$—1 meg. prec. w.w. | $R_{66}$—100K. |
| $R_{32}$—30K. | $R_{67}$—220K, 1 w. |
| $R_{33}$—1 meg., ½ w. | $R_{68}$—550K. |
| $R_{34a}$—25K, w.w. | $R_{69}$—2 meg. precistor 2 w. |
| $R_{34b}$—15K, w.w. | |
| $R_{34c}$—50K, w.w. | |

*Condensers*

| | |
|---|---|
| $C_1$—0.25 μf. | $C_{10}$—.001 μf. |
| $C_2$—.001 μf. | $C_{11}$—.001 μf. |
| $C_3$—470 μμf. | $C_{12}$—15 μμf. |
| $C_4$—0.05 μf. | $C_{13}$—High voltage cap. 15μμf. |
| $C_5$—0.05 μf. | $C_{14}$—0.001 μf. |
| $C_6$—100 μμf. | $C_{15}$—590 μμf. |
| $C_7$—100 μμf. | $C_{16}$—590 μμf. |
| $C_8$—100 μμf. | $C_{17}$—.005 μf. |
| $C_9$—100 μμf. | |

*Electron Tubes*

| | |
|---|---|
| $V_1$—12AT7 | $V_9$—6AU6 |
| $V_2$—6AU6 | $V_{10}$—12AU7 |
| $V_3$, $V_4$, $V_5$—Three tubes 12AT7 | $V_{11}$—6AU6 |
| $V_6$—12AT7 | $V_{12}$—½ 12AT7 |
| $V_7$—6AU6 | $V_{13}$—6AL5 |
| $V_8$—12AT7 | $L_1$—NE—2 |
| | $L_2$—NE—2 |

Thus it is apparent that the arbitrary function generator according to the present invention provides means for generating arbitrary functions having steep slopes and sharp discontinuities at accuracies and speeds not heretofore obtainable. Furthermore, the function masks can be interchanged from tube to tube. The provision of a spot intensity regulator circuit, coupled with orthogonality control of the cathode ray oscilloscope tube, provide exceptional accuracy and precision in the generation of arbitrary functions.

Having described the invention, what is claimed is:

1. In apparatus for function generation, the combination of a cathode ray oscilloscope providing a deflectable electron-illuminated spot, a function-defining mask exterior of said oscilloscope and partially obscuring said spot, means for deflecting the illuminated spot whereby to trace said function and means for maintaining a constant illumination of said spot independent of said mask.

2. Apparatus of claim 1 including means for correcting orthogonality errors of the cathode ray oscilloscope tube.

3. Apparatus of claim 1 including means for resetting a displaced spot on said function.

4. Apparatus of claim 1 wherein the function-defining mask comprises an opaque portion and a thin transparent band, one edge of said band being a function-defining curve.

5. In apparatus for function generation, the combination of a cathode ray oscilloscope providing a deflectable electron-illuminated spot on a flat oscilloscope screen, a function-defining mask exterior of said oscilloscope and partially obscuring said spot, photoelectric means for observing the fraction of the spot not covered by said mask, means responsive to said photoelectric means for maintaining constant the fraction of the spot not covered by the mask whereby the spot traces the function, and means for maintaining a constant illumination of said spot independent of said mask.

6. In apparatus for function generation, the combination of a cathode ray oscilloscope providing a deflectable electron-illuminated spot, a function-defining mask exterior of said oscilloscope and partially obscuring said spot, first photoelectric means for observing the fraction of the spot not covered by said mask, means responsive to said first photoelectric means for maintaining constant the fraction of the spot not covered by the mask whereby to trace the function, second photoelectric means for observing the spot independent of said mask, and means responsive to said second photoelectric means for maintaining a constant illumination of said spot.

7. In apparatus for function generation, the combination of a cathode ray oscilloscope providing a deflectable electron-illuminated spot, a function-defining mask exterior of said oscilloscope and partially covering said spot, first photoelectric means for observing the fraction of the spot not covered by said mask, means responsive to said first photoelectric means for maintaining constant the fraction of the spot not covered by the mask whereby to trace the function, second photoelectric means including a pair of photoelectric detectors in adjacent quadrants and spaced apart from said first photoelectric means for observing the spot independent of said mask, and means responsive to said second photoelectric means for maintaining a constant illumination of said spot.

8. In apparatus for function generation, the combination of a cathode ray oscilloscope providing a deflectable electron-illuminated spot, a function-defining mask exterior of said oscilloscope and partially covering said spot, first photoelectric means for observing the fraction of the spot not covered by said mask, means responsive to said first photoelectric means for maintaining constant the fraction of the spot not covered by the mask whereby to trace the function, second photoelectric means including a pair of photoelectric detectors in adjacent quadrants and spaced apart from said first photoelectric means, for observing the spot independent of said mask, and means responsive to the larger output of said photoelectric detectors for maintaining a constant illumination of said spot.

9. Apparatus of claim 8 including means for resetting a displaced spot on said function.

10. Apparatus of claim 8 including means for correcting orthogonality errors of the cathode ray oscilloscope tube.

11. Apparatus of claim 8 wherein the function-defining mask comprises an opaque portion and a thin transparent band, one edge of said band being a function-defining curve.

12. Apparatus of claim 8 in which the first and the second photoelectric means include photomultiplier tubes.

13. A function defining mask which comprises a normally-transparent plate, an opaque masking area on said plate, a thin transparent band in said opaque masking area, one edge of said band being a function defining curve, and transparent means including two transparent corner portions corresponding to the X axis and X span for aligning the plate with an oscilloscope tube.

14. Mask of claim 13 in which the plate is composed of glass and the opaque masking area is an exposed and developed photographic emulsion.

15. In apparatus for function generation, the combination of a cathode ray oscilloscope having horizontal and vertical deflecting plates, means for applying electron-beam-deflecting voltages to said horizontal deflecting plates, means for applying electron-beam-deflecting voltages to said vertical deflecting plates, means for eliminating any orthogonality error between said vertical deflecting plates and said horizontal deflecting plates comprising means for applying a portion of the voltage from one set of plates to the other set of plates.

16. In a cathode ray tube having horizontal and vertical deflecting plates, means for applying electron beam deflecting voltages to said horizontal deflecting plates, and means for applying electron beam deflecting voltages to said vertical deflecting plates, the improvement comprising means for eliminating any orthogonality error between said vertical deflecting plates and said horizontal deflecting plates comprising means for applying a portion of the voltage from one set of plates to the other set of plates.

17. Cathode ray tube of claim 15 in which means for applying a portion of the voltage from one set of plates to the other set of plates comprises a variable resistance.

18. In a cathode ray device having horizontal and vertical sets of deflecting plates, a fluorescent screen, means for producing an electron illuminated spot on said screen, and means for applying electron beam deflecting voltages to said horizontal deflecting plates and means for applying electron beam deflecting voltages to said vertical deflecting plates, the improvement comprising circuit means including said horizontal and vertical deflecting plates applying through a variable resistance a portion of the voltage on one of said sets of plates to the other of said sets of plates whereby any orthogonality error between said vertical deflecting and said horizontal deflecting plates is eliminated, monitoring means for maintaining a constant illumination intensity of said spot notwithstanding non-uniform phosphor sensitivity on said screen and line voltage fluctuations to said spot-producing means, said monitoring means including a pair of photoelectric detectors in adjacent quadrants sensitive to the illumination intensity of the electron illuminated spot, means responsive to one of said photoelectric detectors in said pair for controlling the spot-producing means to maintain the constant illumination intensity of said spot, and a mask having an opaque portion and a narrow transparent band, an edge of said band representing a function defining curve, said band being at least as wide as the spot diameter and narrower than the spot halo whereby the illumination intensity of the spot is maintained constant in response only to the spot and not in response to the accompanying halo.

References Cited in the file of this patent

UNITED STATES PATENTS

| | | |
|---|---|---|
| 959,249 | Nielson | May 24, 1910 |
| 2,455,532 | Sunstein | Dec. 7, 1948 |
| 2,734,137 | Patterson | Feb. 7, 1956 |
| 2,764,697 | Duke | Sept. 25, 1956 |
| 2,817,702 | Graham et al. | Dec. 24, 1957 |
| 2,849,180 | Burke et al. | Aug. 26, 1958 |
| 2,861,214 | Smura | Nov. 18, 1958 |
| 2,887,587 | Polimerou | May 19, 1959 |
| 2,943,207 | Burlis et al. | June 28, 1960 |

OTHER REFERENCES

Newhall: Electronics, June 1955, pp. 149–151.